/ 10

(12) United States Patent
Ogasawara et al.

(10) Patent No.: US 8,677,110 B2
(45) Date of Patent: Mar. 18, 2014

(54) TERMINATION-LOG ACQUIRING PROGRAM, TERMINATION-LOG ACQUIRING DEVICE, AND TERMINATION-LOG ACQUIRING METHOD

(75) Inventors: Kanako Ogasawara, Hiroshima (JP); Tadashi Okada, Hiroshima (JP)

(73) Assignee: Fujitsu Limited, Kawasaki (JP)

(*) Notice: Subject to any disclaimer, the term of this patent is extended or adjusted under 35 U.S.C. 154(b) by 128 days.

(21) Appl. No.: 13/137,876

(22) Filed: Sep. 20, 2011

(65) Prior Publication Data

US 2012/0084546 A1 Apr. 5, 2012

(30) Foreign Application Priority Data

Sep. 30, 2010 (JP) ................................. 2010-221743

(51) Int. Cl.
*G06F 21/00* (2013.01)
(52) U.S. Cl.
USPC .................. 713/2; 713/1; 713/300; 713/310; 713/340; 714/14; 714/21; 714/22; 714/23; 714/24
(58) Field of Classification Search
USPC ............ 713/1–2, 300–601; 714/100, 1–2, 14, 714/21–24, 37–57
See application file for complete search history.

(56) References Cited

U.S. PATENT DOCUMENTS

| 7,707,376 | B2 * | 4/2010 | Ogawa et al. | 711/162 |
| 2003/0140259 | A1 * | 7/2003 | Chan et al. | 713/300 |
| 2005/0149493 | A1 * | 7/2005 | Yamashita et al. | 707/2 |
| 2007/0286050 | A1 * | 12/2007 | Araki et al. | 369/99 |
| 2011/0289282 | A1 * | 11/2011 | Obr et al. | 711/154 |

FOREIGN PATENT DOCUMENTS

JP 2005-332258 12/2005

* cited by examiner

*Primary Examiner* — Madhuri Herzog
(74) *Attorney, Agent, or Firm* — Staas & Halsey LLP

(57) ABSTRACT

A client terminal receives, in response to a boot command issued by a user to boot the client terminal, a first start command to start monitoring. The client terminal acquires first time information, repeatedly at certain time intervals from a basic software, and stores the first time information in a storage area. The client terminal receives a termination command to terminate the basic software. If the termination command is a command to terminate the basic software by using the basic software, the client terminal stores normal termination information in the storage area. When a second start command is received, and no normal termination information is stored in the storage area, the client terminal acquires second time information from the basic software and creates, depending on a result of comparison between the second time information and the first time information, log information relating to a termination of the basic software.

10 Claims, 10 Drawing Sheets

FIG.3

| USER ID | SID |
|---|---|
| User A | S-1-5-21-1234567890-1234842xxxxxxx |
| User B | S-1-5-21-7382364813-7264722xxxxxxx |

FIG.4

| DATE AND TIME | TYPE | USER NAME | REMARKS |
|---|---|---|---|
| 02/25/2010 10:00:15:100 | LOG-ON | User A | ... |
| 02/25/2010 13:10:46:100 | LOG-ON | User B | ... |

FIG.5

| SYSTEM DATE | 20100225134532100 |
|---|---|
| OS COUNTER | 20582 |

FIG.6

| USER ID | SID |
|---|---|
| User A | S-1-5-21-1234567890-1234842xxxxxxx |
| User C | S-1-5-21-5524773582-7264722xxxxxxx |

FIG.7

| USER ID | SID |
|---|---|
| User A | S-1-5-21-1234567890-1234842xxxxxxx |
| User B | S-1-5-21-7382364813-7264722xxxxxxx |
| User C | S-1-5-21-5524773582-7264722xxxxxxx |

FIG.8

| DATE AND TIME | TYPE | USER NAME | REMARKS |
|---|---|---|---|
| 25/02/2010 10:00:15:100 | LOG-ON | User A | ... |
| 25/02/2010 13:10:46:100 | LOG-ON | User B | ... |
| 25/02/2010 13:45:32:100 | LOG-ON | User C | ... |

TERMINATION-LOG ACQUIRING PROGRAM, TERMINATION-LOG ACQUIRING DEVICE, AND TERMINATION-LOG ACQUIRING METHOD

CROSS-REFERENCE TO RELATED APPLICATION

This application is based upon and claims the benefit of priority of the prior Japanese Patent Application No. 2010-221743, filed on Sep. 30, 2010, the entire contents of which are incorporated herein by reference.

FIELD

The embodiments discussed herein are directed to a termination-log acquiring program, a termination-log acquiring device, and a termination-log acquiring method.

BACKGROUND

Operation logs are collected as a measure to prevent information leakage from computers of end users who belong to organizations or the like. The computers can be, for example, personal computers (PCs). The operation logs collected from the PCs are used for monitoring the PCs, inspecting the PCs in case there is any information leakage, and analyzing the PCs in order to manage the risk of information leakage.

Such operation logs are, for example, a log that relates to the termination of the basic software that operates on a PC, such as the operating system (OS). Such a log that relates to the termination of an OS is, for example, a log of a user logging-off from a PC and a log of a PC being shutdown. Logging-off from a PC and the shutting down of a PC are performed by the OS. Therefore, to collect logs that relate to a termination of an OS, a monitoring application program monitors the OS and collects the time a user logs off and the time a PC is shutdown.

The technology disclosed in Japanese Laid-open Patent Publication No. 2005-332258 enables, when the PC is shut down abnormally, the conducting of a forced shutdown of the hardware and then the acquiring of a log indicative of an abnormal termination.

However, when a user shuts down a PC forcibly without entering an OS termination instruction, the monitoring application program disclosed in Japanese Laid-open Patent Publication No. 2005-332258 may not collect a log that relates to the termination of the OS.

For example, when a normal termination occurs, the monitoring application program updates both time information that has been acquired from the OS and time information that has been acquired from the OS and then held by the monitoring application program to defaults and then creates a normal termination log indicative of a normal termination. The time information can be an OS counter indicative of the time elapsed since the OS was last booted. When a forced termination occurs, there is no time for the monitoring application program to update the OS counter, which has been acquired from the OS and then held by the monitoring application program, to zero and also there is no time to create a log. When the monitoring application program is booted later, because the OS counter held by the monitoring application program is not zero, it is determined that a log that relates to the termination of the OS was not created at the last termination of the monitoring application program. The monitoring application program then uses the time that has been counted by the monitoring application program before the last termination to create a log of the last termination of the OS.

However, because a log is created depending on whether the OS counter held by the monitoring application program is zero or not, an acquired log that relates to a termination of an OS can be incorrect. The monitoring application program may not update the OS counter to zero not only when a forced termination occurs but also when the monitoring application program is terminated abnormally. Accordingly, when the monitoring application program is terminated abnormally while the PC is still running, the rebooted monitoring application program creates a log of a log-off from the PC and a log of a PC shutdown, and thus incorrect logs are created.

SUMMARY

According to an aspect of an embodiment of the invention, A non-transitory computer readable storage medium having stored therein a termination-log acquiring program that causes a computer to execute a process includes: receiving first start command information indicative of a command to start monitoring in response to a boot command issued by a user to boot the computer; acquiring, when the first start command information is received, first time information, repeatedly at certain time intervals from basic software that operates on the computer; storing the first time information acquired repeatedly at the certain time intervals in a storage area; receiving termination command information indicative of a command to terminate the basic software; when the received termination command information is information indicative of a command to terminate the basic software by using the basic software, storing normal termination information indicative of a normal termination in the storage area; when second start command information that is different from the first start command information is received, accessing the storage area; when the normal termination information is not stored in the storage area, acquiring second time information from the basic software; comparing the second time information with the first time information that is stored in the storage area; and creating, depending on a comparison result, log information that relates to a termination of the basic software.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a table of an example of a log-on user list;

FIG. 4 is a table of an example of log information;

FIG. 5 is a table of an example of time information;

FIG. 6 is an example of an SID list acquired from an OS executing unit;

FIG. 7 is a table of an example of the updated log-on user list;

FIG. 8 is a table that includes an example of a created log-on log;

DESCRIPTION OF EMBODIMENTS

Preferred embodiments of the present invention will be explained with reference to accompanying drawings. The disclosed technology is not limited to the following embodiments. The following embodiments can be combined appropriately so long as the combined one does not involve any contradictory process.

[a] First Embodiment

System Configuration

Figure 1:
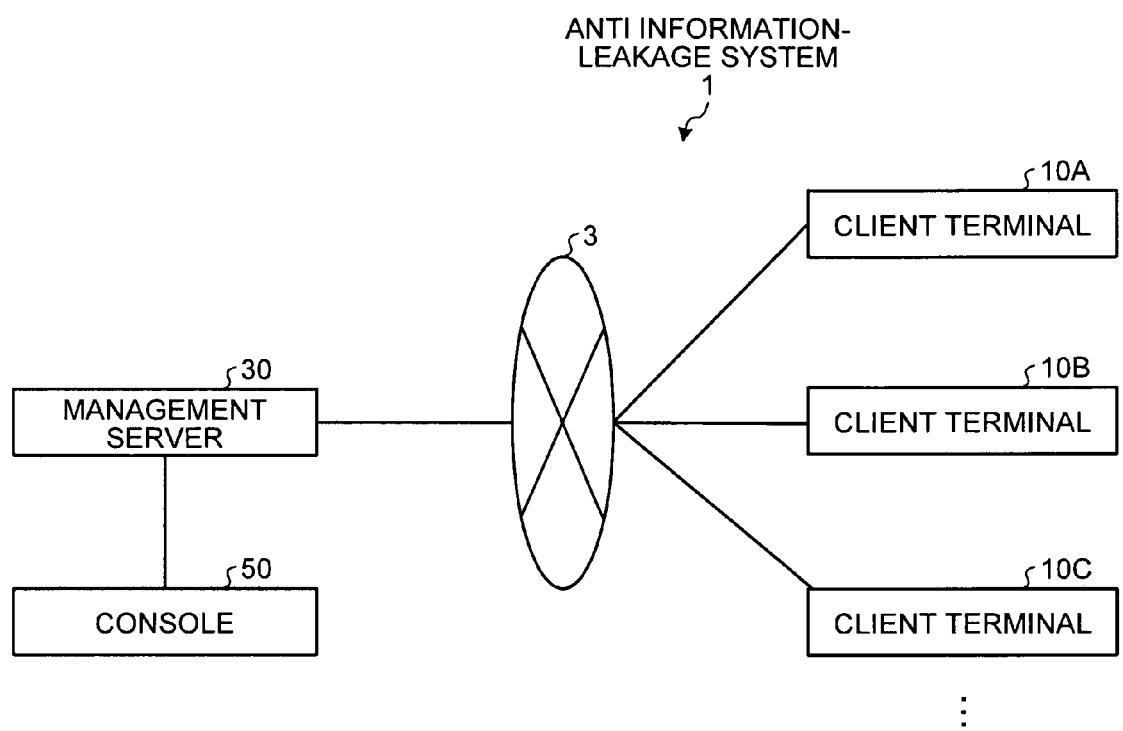
FIG. 1 is schematic diagram of the configuration of an anti information-leakage system according to the first embodiment.

An anti information-leakage system according to the first embodiment is described below. FIG. 1 is schematic diagram of the configuration of an anti information-leakage system according to the first embodiment. In the example of FIG. 1, as measures to prevent information leakage by a user, logs are collected from client terminals 10A to 10C of end users who belong to organizations or the like and the collected logs are sent to a management server 30.

As illustrated in FIG. 1, an anti information-leakage system 1 includes the client terminals 10A to 10C, the management server 30, and a console 50. Although, in the example of FIG. 1, three client terminals, one management server, and one console are illustrated, the disclosed system is not limited to the illustrated configuration. In other words, the anti information-leakage system 1 can include an arbitrary number of client terminals, an arbitrary number of management servers, and an arbitrary number of consoles. In the following, if the individual client terminals 10A to 10C are not needed to distinguish from each other, they are collectively called "client terminal 10". It is noted that the client terminal 10A can operate as the management server 30 and the management server 30 can additionally have functions of the client terminal 10.

The client terminals 10A to 10C and the management server 30 are connected to each other via a network 3. The network 3 is either a wireless network or wired network. The network 3 is any type of network, such as the Internet, a local area network (LAN), a virtual private network (VPN). Although, in the example of FIG. 1, the management server 30 is directly connected to the console 50, the management server 30 can be connected to the console 50 indirectly via a network.

The management server 30 manages the client terminal 10. The management server 30 causes each client terminal 10 that is connected thereto via the network 3 to download anti information-leakage software and then install it. The anti information-leakage software includes a plurality of modules of application software, each module having a function. Hereinafter, application is abbreviated to "app".

Apps included in the anti information-leakage software are, for example, a log-off/log-on monitoring app, a mail monitoring app, and an access monitoring app. The log-off/log-on monitoring app has, for example, a function of collecting a log of a log-on to the operating system (OS) that operates on the client terminal 10 and a log of a log-off from the OS. The log-off/log-on monitoring app further has a function of collecting a log of a shutdown of the client terminal 10. The mail monitoring app has, for example, a function of collecting a mail sending log. The access monitoring app has, for example, a function of collecting a log of an access to a world wide web (WEB). In the following, the above three apps are collectively called "monitoring apps".

The monitoring apps that are used to collect operation logs of the client terminal 10 are described in the above. The client terminal 10 can install therein a monitoring app that is used to prohibit or limit a particular operation. Although, in the above, the anti information-leakage software is downloaded, under the control of the management server 30, to the client terminal 10 and then installed in the client terminal 10, the manner of installation is not limited thereto. For example, the anti information-leakage software may be read from a portable physical medium, such as a flexible disk (FD), a CD-ROM, a DVD, a magnet-optical disk, and an IC card and then installed in the client terminal 10. Alternatively, the anti information-leakage software may be pre-installed in the client terminal 10.

By using the monitoring apps installed in the client terminal 10 in the above manner, the management server 30 collects operation logs of each of the client terminals 10A to 10C, such as a log-on/log-off log, a shutdown log, a mail sending log, and an access log. When the management server 30 is in connection to the client terminal 10 via the network 3, such operation logs are received at arbitrary timing. For example, the operation logs are received on a real-time basis each time the client terminal 10 collects an operation log by using the monitoring apps. Alternatively, at each boot-up of the client terminal 10, operation logs that have been collected by using the monitoring apps are received.

The console 50 is a terminal of an administrator who has an administrator authority. The administrator authority is set by a system administrator in advance. The console 50 has, for example, a function of reading the operation logs stored in the management server 30, and a function of a policy of operation logs collected by the monitoring apps operating on the client terminal 10 to the management server 30. The "policy", herein, sets collection of operation logs by the client terminal 10 to be valid or invalid depending on the types of operation logs, such as log-on logs, log-off logs, shutdown logs, mail sending logs, and access logs.

The client terminal 10 is a terminal device of an end user. The client terminal 10 can be, for example, a stationary terminal, such as a personal computer (PC), and a mobile terminal, such as a cellular phone, a personal handyphone system (PHS) and a personal digital assistant (PDA). Although, in the following, the client terminal 10 is assumed to be a personal computer (abbreviated to "PC"), the client terminal 10 can be another information processing apparatus.

The above monitoring apps are installed in the client terminal 10. The monitoring apps that are installed in the client terminal 10 are booted automatically when the OS is booted. When the OS is active, the monitoring apps monitor each other's active state, for example, boot-up of any process. If a first monitoring app detects that a second monitoring app is inactive, the first monitoring app sends a command, for example, an application program interface (API) command to the OS of the client terminal 10 to reboot the second monitoring app. With this configuration, each monitoring app keeps operating when the client terminal 10 is powered on.

If the OS has been terminated abnormally, the client terminal 10 according to the first embodiment determines, when the log-off/log-on monitoring app is booted, whether the abnormal termination of the monitoring app is caused by a forced shutdown of the PC or an abnormal stop of the monitoring app. More particularly, the client terminal 10 according to the first embodiment determines the reason for the last termination of the monitoring app by using a termination time that has been acquired by the monitoring app via the OS and then held by the monitoring app and a boot-up time that is acquired by the monitoring app via the OS at this boot-up. In other words, the client terminal 10 according to the first embodiment determines whether the difference between the above times, i.e., the interval between the last termination time and this boot-up time denies the possibility that this monitoring app is rebooted by another monitoring app. The client terminal 10 according to the first embodiment determines, by using a fact that a time that is taken to reboot a monitoring app by another monitoring app is shorter than a time that is taken to reboot the PC, whether the possibility that the monitoring app is rebooted by another monitoring app is denied. If the possibility is denied, the client terminal 10 determines that the reason for the termination of the monitoring app is a forced shutdown of the PC. Only when the reason is a forced shutdown of the PC, the client terminal 10 according to the present embodiment creates a log of the PC shutdown and a log of the log-off from the PC.

Therefore, the client terminal 10 according to the first embodiment does not create, in event of an abnormal stop of the monitoring app during the client terminal 10 being running, a log of a shutdown of the PC and a log of a log-off from the PC. Therefore, the client terminal 10 according to the first embodiment can acquire a correct log that relates to a termination of the basic software, such as a log of a shutdown of the PC and a log of a log-off from the PC.

Configuration of the Client Terminal

Figure 2:
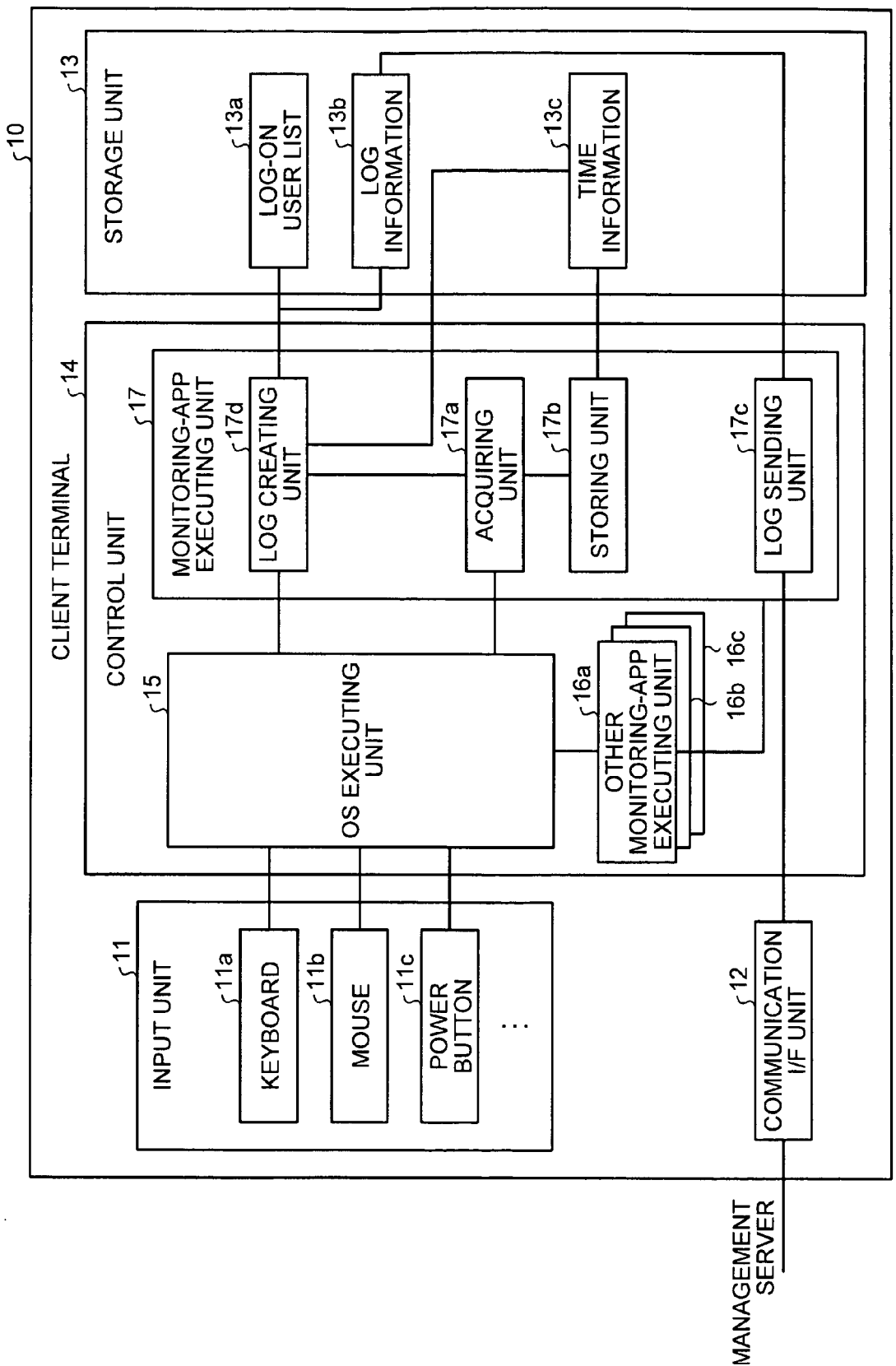
FIG. 2 is a block diagram of the configuration of a client terminal according to the first embodiment.

The configuration of the client terminal is described below according to the first embodiment. FIG. 2 is a block diagram of the configuration of the client terminal according to the first embodiment. As illustrated in FIG. 2, the client terminal 10 includes an input unit 11, a communication I/F unit 12, a storage unit 13, and a control unit 14. Although not illustrated in FIG. 2, the client terminal 10 further includes the functional units that a well-known computer has, such as a display device e.g., a monitor and an audio device, e.g., an audio input unit and an audio output unit.

The input unit 11 is an input device that receives an instruction to a later-described OS executing unit 15. An example of the input unit 11 is a keyboard 11*a* that has normal keys, such as alphabet keys, kana keys, numeric keys, and sign keys, and auxiliary keys, such as a shift key and a control key. Another example of the input unit 11 is a mouse 11*b* that is a pointing device. Another example of the input unit 11 is a power button 11*c* that is used to power on the PC or the client terminal 10 or shut down the client terminal 10 forcibly. The keyboard 11*a*, the mouse 11*b*, and the power button 11*c* are embodiments of a second receiving unit that receives termination command information to terminate the OS.

The communication I/F unit 12 is an interface that is used to make communications between, for example, the management server 30 and another client terminal 10.

The storage unit 13 is, for example, a semiconductor memory element, such as a random access memory (RAM), a read only memory (ROM), and a flash memory. The storage unit 13 is not limited to the above storage device and can be a hard disk or an optical disk.

The storage unit 13 stores therein various programs, such as an operating system (OS) executed by the control unit 14, the monitoring apps, and generally-used apps. The storage unit 13 stores therein data, for example, data that is needed when the control unit 14 executes the programs, such as data including an operation log that is used by a later-described monitoring-app executing unit 17. The storage unit 13 stores therein, for example, a log-on user list 13*a*, log information 13*b*, and time information 13*c*.

The log-on user list 13*a* is a list of users who log-on to the client terminal 10. The log-on user list 13*a* includes, for example, a user ID and an SID assigned to each other. The "user ID" is identification information that is used to identify a user who has an account given thereto that is needed to log-on to the client terminal 10. The "SID (session identifier)" is identification information that is issued to identify a log-on user and acquire behavior of the log-on user, thereby enabling session management. In accordance with user's log-on and log-off, a later-described log creating unit 17*d* adds the user ID and the SID of the log-on user to the log-on user list 13*a* and deletes the user ID and the SID of the log-off user from the log-on user list 13*a*.

FIG. 3 is a table of an example of the log-on user list. The example of FIG. 3 indicates that a user who has the user ID "User A" is in log-on to the client terminal 10 and the user is assigned with the SID "S-1-5-21-1234567890-1234842xxxxxxx". The example of FIG. 3 further indicates that a user who has the user ID "User B" is in log-on to the client terminal 10 and the user is assigned with the SID "S-1-5-21-7382364813-7264722xxxxxxx". Although the example of FIG. 3 is a list of log-on users, the data structure can be an arbitrary form.

The log information 13*b* is information indicative of various operation logs. The log information 13*b* can include, for example, a log of a log-on to the client terminal 10, a log of a log-off from the client terminal 10, a log of a shutdown of the client terminal 10, etc. The log-on log, the log-off log, and the shutdown log are registered by the later-described log creating unit 17*d*. The shutdown log is registered by the later-described log creating unit 17*d* only when it is determined that the client terminal 10 has been forced to shut down. Although, in the following, a shutdown log is registered only when the client terminal 10 has been forced to shut down, it is allowable to register a shutdown log when the client terminal 10 has been shut down normally. It is also allowable to acquire a log-off log regardless of either a normal shutdown or a forced shutdown.

FIG. 4 is a table of an example of the log information. In the example of FIG. 4, the log information 13*b* includes a log-on log and a log-off log. Each of the log-on log and the log-off log is assigned with date and time, type, user name, and remarks. The type, herein, indicates whether the log is a log-on log or a log-off log. The example of FIG. 4 indicates that a user who has the user name "User A" logs on at the date and time "25/02/2010 10:00:15:100". The example of FIG. 4 indicates that a user who has the user name "User B" logs on at the date and time "25/02/2010 13:10:46:100". In the example of FIG. 4, the field "remarks" is blank. The field "remarks" can include an arbitrary matter that relates to the log-on or the log-off. The field "remarks" can include, for example, a message that the log-on user is a guest or a message that the log-on time is out of the work hours.

The time information 13*c* indicates the time elapsed since the OS was last booted. The time information 13*c* is, for example, a system date and an OS counter. The "system date", herein, indicates a date managed by the OS. The "OS counter" is a counter of the OS that counts the time elapsed since the OS was last booted. FIG. 5 is a table of an example of the time information. The example of FIG. 5 indicates that the time counted by the OS executing unit 15 is 25/02/2010 13:45:32, 20582 seconds has elapsed since the client terminal 10 was last booted. It is noted that a later-described acquiring unit 17a acquires the system date and the OS counter that are under management of the later-described OS executing unit 15 and then a later-described storing unit 17b stores the acquired data.

The control unit 14 is an electric circuit, such as a central processing unit (CPU) and a micro processing unit (MPU), or an integrated circuit, such as an application specific integrated circuit (ASIC) and a field programmable gate array (FPGA).

The control unit 14 has an internal memory that stores therein control data and programs that define various processing procedures. The control unit 14 performs various processes using the control data and the programs. As illustrated in FIG. 2, the control unit 14 includes the OS executing unit 15, other monitoring-app executing units 16a to 16c, and the monitoring-app executing unit 17. In the following, the monitoring apps other than the abovementioned log-off/log-on monitoring app, such as, the mail monitoring app, the access monitoring app are called "other monitoring apps".

The OS executing unit 15 is a processing unit that controls execution of the OS or the basic software that controls the computer system.

The OS executing unit 15 executes, for example, a process that relates to booting-up and terminating the OS. For example, when the power button 11c is pushed down and an OS boot-up request is received, the OS executing unit 15 boots the OS up. When a request to shut down the client terminal 10 is received by operation of the keyboard 11a and the mouse 11b, the OS executing unit 15 logs the log-in user off, saves various settings assigned to the OS and the apps, and terminates the OS. In this case, the client terminal 10 is shut down normally. In contrast, if the client terminal 10 is forced to shut down by operation of the power button 11c, the OS is forced to terminate, so that the log-in user are forced to log off and various settings assigned to the OS and the apps are unsaved. In this case, the client terminal 10 is forced to shut down.

As another example, the OS executing unit 15 executes processes that relate to log-on and log-off. For example, when receiving a log-on request from a user by operation of the keyboard 11a and the mouse 11b, the OS executing unit 15 conducts log-on authentication, if the user is authentic, issues the SID, and then logs on the user. When receiving a log-off request from a user by operation of the keyboard 11a and the mouse 11b, the OS executing unit 15 deletes the SID of the log-in user, thereby logging off the user. When receiving an SID acquiring request from the later-described log creating unit 17d, the OS executing unit 15 returns the SIDS of the log-on users. Although, in the following, the OS is configured to receive log-on requests from a plurality of users at the same time, the OS can be configured to receive a log-on request from one user in an exclusive manner.

As another example, the OS executing unit 15 executes a process for managing the time information. For example, the OS executing unit 15 updates the system date in accordance with the elapsed time and increases the OS counter in accordance with the elapsed time. When receiving a system date/OS counter inquiry from the later-described acquiring unit 17a, the OS executing unit 15 returns the value of the system date and the value of the OS counter to the acquiring unit 17a.

As another example, the OS executing unit 15 executes a process for managing processes of the log-off/log-on monitoring app, the mail monitoring app, the access monitoring app, and the generally-used apps performed by the client terminal 10. For example, when receiving, from any of the later-described other monitoring-app executing units 16a to 16c and the monitoring-app executing unit 17, an inquiry whether any monitoring app other than the inquiry issuing app is active, the OS executing unit 15 returns to the inquiry issuing monitoring app whether any monitoring app other than the inquiry issuing app is active. When receiving, from any of the later-described other monitoring-app executing units 16a to 16c and the monitoring-app executing unit 17, a request to reboot any monitoring app other than the request issuing app, the OS executing unit 15 reboots the target monitoring app. It is noted that the client terminal 10 performs management of processes of apps other than the log-off/log-on monitoring app, the mail monitoring app, and the access monitoring app, such as word processing software, spreadsheet software, drawing software, etc.

The other monitoring-app executing units 16a to 16c are processing units that control executions of the mail monitoring app and the access monitoring app. Each of the other monitoring-app executing units 16a to 16c, herein, controls executions of one monitoring app. The other monitoring-app executing units 16a to 16c monitor each other by sending an inquiry to the OS executing unit 15 to check whether any monitoring app that is out of the execution control thereof is active. If the other monitoring-app executing units 16a to 16c receive, from the OS executing unit 15, a reply indicating that there is an inactive monitoring app, they output an API to the OS executing unit 15 to reboot the inactive monitoring app. In the following, the other monitoring-app executing units 16a to 16c can be collectively called "other monitoring-app executing unit 16".

The monitoring-app executing unit 17 is a processing unit that controls executions of the log-off/log-on monitoring app. As illustrated in FIG. 2, the monitoring-app executing unit 17 further includes the acquiring unit 17a, the storing unit 17b, a log sending unit 17c, and the log creating unit 17d.

The acquiring unit 17a is a processing unit that acquires the time information that is counted by the OS executing unit 15. For example, the acquiring unit 17a outputs a system date/OS counter inquiry to the OS executing unit 15 every, for example, one second over a certain period. The acquiring unit 17a then acquires the value of the system date and the value of the OS counter as a reply to the inquiry. Although, in the above example, the time information is acquired at constant intervals, the configuration of the disclosed device is not limited thereto. For example, the interval can be variable depending on a time zone. The time information can be acquired at certain points of time.

The storing unit 17b is a processing unit that stores the time information that is acquired by the acquiring unit 17a in the storage unit 13. The time information can be stored in the storage unit 13 in the form of setting data, i.e., a registry of the log-off/log-on monitoring app or can be stored in the storage unit 13 in the form of a file.

The log sending unit 17c is a processing unit that sends the log information 13b stored in the storage unit 13 to the management server 30. The log sending unit 17c sends the log information 13b to the management server 30 at an arbitrary timing. For example, each time when the later-described log creating unit 17d creates log information, the log sending unit 17c sends the log information on a real-time basis. Alternatively, the log sending unit 17c can be configured to send the log information 13b stored in the storage unit 13 when the client terminal 10 is booted or when the client terminal 10 is connected to a network.

The log creating unit 17d is a processing unit that creates log information that relates to a termination of the OS. Although, in the following example, the log creating unit 17d creates a log of a log-on to the client terminal 10, a log of the log-off from the client terminal 10, and a log of a shutdown of the client terminal 10, the log creating unit 17d can be configured to create only a log-off log and a shutdown log.

For example, over a certain period, each time when the storing unit 17b stores the time information in the storage unit 13, the log creating unit 17d updates a log-on log and/or a log-off log in accordance with SIDs of log-on users that are acquired from the OS executing unit 15.

More particularly, the log creating unit 17d sends an SID acquiring request to the OS executing unit 15 and acquires SIDs of log-on users. The log creating unit 17d then determines whether the SIDs acquired from the OS executing unit 15 includes an SID that is not identical to any SID of the log-on user list 13a stored in the storage unit 13. If there is an SID that is not identical to any SID of the log-on user list 13a, it is found addition of a new SID because of new user's log-on. Therefore, the log creating unit 17d adds the new user ID and the new SID to the log-on user list 13a and registers the user ID and the SID to the log information 13b as a log-on log.

The log creating unit 17d further determines whether the SIDs of the log-on user list 13a stored in the storage unit 13 includes an SID that is not identical to any SID acquired from the OS executing unit 15. If there is an SID that is not identical to any SID acquired from the OS executing unit 15, there is a log-on user who has logged off and his/her SID has been deleted. Therefore, the log creating unit 17d deletes the user ID and the SID of the log-off user from the log-on user list 13a and registers the user ID and the SID to the log information 13b as a log-off log. With this configuration, even if a plurality of users log-on to the same client terminal at the same time, logs are independently created on the user basis.

Figure 9:
FIG. 9 is a table of an example of the updated log-on user list.
Figure 10:
FIG. 10 is a table that includes a created log-off log.

Creation of a log-on log and a log-off log is described below with reference to FIGS. 6 to 10. FIG. 6 is an example of the SID list acquired from the OS executing unit. FIGS. 7 and 9 are tables of examples of the updated log-on user list. FIG. 8 is a table that includes an example of a created log-on log. FIG. 10 is a table that includes a created log-off log.

When, for example, the SID list illustrated in FIG. 6 is acquired from the OS executing unit 15, the log creating unit 17d compares the SID list with the log-on user list 13a illustrated in FIG. 3 and detects that the SID "S-1-5-21-5524773582-726422xxxxxxx" of the "User C" is a new SID. In this situation, as illustrated in FIG. 7, the log creating unit 17d adds the new SID "S-1-5-21-5524773582-726422xxxxxxx" of the "User C" to the log-on user list 13a illustrated in FIG. 3. After that, as illustrated in FIG. 8, the log creating unit 17d registers a new record having the new user ID "User C", the new SID "S-1-5-21-5524773582-726422xxxxxxx", and the type "log-on" to the log information 13b illustrated in FIG. 4.

When the SID list illustrated in FIG. 6 is acquired from the OS executing unit 15, the log creating unit 17d compares the SID list with the log-on user list 13a illustrated in FIG. 3 and detects that the SID "S-1-5-21-7382364813-7264722xxxxxxx" of the "User B" is an old SID. In this situation, as illustrated in FIG. 9, the log creating unit 17d deletes the old and log-off SID "S-1-5-21-7382364813-7264722xxxxxxx" of the "User B" from the log-on user list 13a illustrated in FIG. 7. After that, as illustrated in FIG. 10, the log creating unit 17d registers a new record having the old and log-off user ID "User B", the SID "S-1-5-21-7382364813-7264722xxxxxxx", and the type "log-off" to the log information 13b illustrated in FIG. 4.

Figure 11:
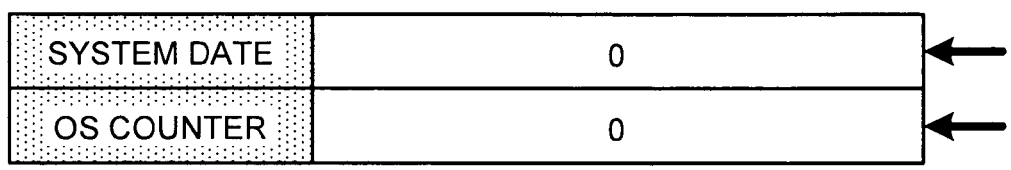
FIG. 11 is a table of time information after cleared.

As another example, when the OS executing unit 15 receives a shutdown request, the log creating unit 17d executes a process to terminate the log-off/log-on monitoring app. For example, the log creating unit 17d deletes the user IDs and the SIDs from the log-on user list 13a and then registers the user IDs and the SIDs to the log information 13b as log-off logs. The log creating unit 17d updates the value of the system date and the value of the OS counter that are stored as the time information 13c to zero. FIG. 11 is a table of the time information after cleared. As illustrated in FIG. 11, when the OS executing unit 15 receives a shutdown request, the log creating unit 17d updates the time information 13c illustrated in FIG. 5 to zero. With this process, when the monitoring app is booted later, it is detected that the monitoring app has been terminated due to a shutdown of the PC. As described above, if the termination command information indicates a command to terminate the OS by using the OS, the log creating unit 17d also operates as a normal-termination-information storing unit that stores, in the storage unit 13, normal termination information indicative of a normal termination and information indicating that the system date and the OS counter are in a default state. The function of the normal-termination-information storing unit can be assigned to a functional unit separated from the log creating unit 17d.

As another example, when the log-off/log-on monitoring app is booted, the log creating unit 17d creates a log of the last log-off and a log of the last shutdown in accordance with the difference between the time information 13c stored in the storage unit 13 and the time information that is acquired at this boot-up by the acquiring unit 17a. The log creating unit 17d is an example of the log creating unit that creates log information that relates to a termination of the OS. The log creating unit 17d also operates as a first receiving unit that receives, in response to a PC booting command issued by a user, first start command information that includes a command to start monitoring. The function of the first receiving unit can be assigned to a functional unit separated from the log creating unit 17d.

More particularly, when the monitoring app is booted, the log creating unit 17d causes the acquiring unit 17a to acquire the system date and the OS counter from the OS executing unit 15. After that, the log creating unit 17d reads the system date and the OS counter that are stored in the storage unit 13 as the time information 13c. Hereinafter, the value of the system date acquired by the acquiring unit 17a at the boot-up is called "system-date acquired value" and the value of the OS counter acquired by the acquiring unit 17a at the boot-up is called "OS-counter acquired value". The value of the system date stored in the storage unit 13 as the time information 13c is called "system-date stored value" and the value of the OS counter stored in the storage unit 13 as the time information 13c is called "OS-counter stored value". As described above, the log creating unit 17d also operates as an accessing unit that accesses a storage area of the storage unit 13 in which the time information is stored. The function of the accessing unit can be assigned to a functional unit separated from the log creating unit 17d.

The log creating unit 17d then determines whether the system-date stored value is zero. If the system-date stored value is zero, it is determined that the monitoring app has been terminated due to a normal shutdown of the PC. Therefore, if the system-date stored value is zero, the log creating unit 17d does not create a log-off log and a shutdown log and the process control goes to a process of periodically monitoring user's log-on and log-off. On the other hand, if the system-date stored value is not zero, it is determined that the monitoring app has been terminated abnormally. It means that the client terminal 10 has been forced to shut down or an abnormal stop of the monitoring app has occurred. Although, in the present embodiment, whether the monitoring app has been terminated normally is determined depending on whether the system-date stored value is zero, the determination can be made depending on whether the OS-counter stored value is zero.

If the system-date stored value is not zero, the log creating unit 17d further determines whether the difference between the system-date acquired value and the system-date stored value is less than a certain threshold, for example, 10 seconds. The "threshold", herein, is not limited to 10 seconds. The threshold can be any value so long as the value is useful to deny the possibility that the monitoring app is rebooted by inter-booting among the monitoring apps, i.e., a time that is needed to reboot the PC.

The monitoring apps monitor each other's active state and, if any monitoring app is in an abnormal stop, reboot the inactive monitoring app; therefore, the possibility is less that any monitoring app is in an abnormal stop for a long time. In contrast, although the time taken to reboot the PC changes depending on the performance of the PC, the time taken to reboot the PC is much longer than the time taken to reboot the monitoring app. Even when the user shuts down the PC forcibly and immediately boots the PC up, the time taken to reboot the PC is much longer than the time taken to reboot the monitoring app. When the user shuts down the PC forcibly and, some time later, boots the PC up, the time increases further. Accordingly, the time taken to reboot the monitoring app is shorter than the time taken to reboot the PC. Therefore, if the difference between the system-date acquired value and the system-date stored value is equal to or higher than a certain value, it is determined that the monitoring app has been terminated due to a forced shutdown of the PC and the monitoring app is rebooted in conjunction with a reboot of the PC.

Therefore, if the difference between the system-date acquired value and the system-date stored value is equal to or higher than the certain value, the log creating unit 17d registers user IDs and SIDs stored in the log-on user list 13a to the log information 13b as log-off logs. Moreover, the log creating unit 17d sets the system-date stored value that is stored in the storage unit 13 as the time information 13c to the last PC shutdown date, creates a PC shutdown log that includes both the PC shutdown date and information indicative of a forced shutdown of the PC in the form of, for example, a flag, and registers the PC shutdown log to the log information 13b. On the other hand, if the difference between the system-date acquired value and the system-date stored value is lower than the certain value, because the time taken to reboot the monitoring app << the time taken to reboot the PC, the determination using the system date is not enough to determine an abnormal stop of the monitoring app and there is a possibility that the PC has been rebooted. This is because the user can change the system date easily as he/she changes OS settings. If the user changes the system date and the difference decreases to a value lower than the certain value, a correct log-off log may not be acquired.

Therefore, if the difference between the system-date acquired value and the system-date stored value is lower than the certain value, the log creating unit 17d further determines whether the OS-counter acquired value is higher than the OS-counter stored value. When the PC is rebooted, the OS executing unit 15 updates the OS counter to zero after the reboot. In contrast, when an abnormal stop of the monitoring app occurs, because the OS is still active, the OS counter is not updated to zero, increasing continuously. Therefore, if the OS-counter acquired value is higher than the OS-counter stored value, it is determined that an abnormal stop of the monitoring app has occurred. On the other hand, if the OS-counter acquired value is equal to or lower than The OS-counter stored value, it is determined that the PC has been forced to shut down.

Therefore, if the OS-counter acquired value is higher than the OS-counter stored value, the log creating unit 17d does not create a log-off log and a shutdown log and the process control goes to a process of periodically monitoring user's log-on and log-off.

Moreover, if the OS-counter acquired value is equal to or lower than the OS-counter stored value, the log creating unit 17d registers user IDs and SIDS stored in the log-on user list 13a to the log information 13b as log-off logs. Moreover, the log creating unit 17d sets the system-date stored value that is stored in the storage unit 13 as the time information 13c to the last PC shutdown date, creates a PC shutdown log that includes both the PC shutdown date and information indicative of a forced shutdown of the PC in the form of, for example, a flag, and registers the PC end log to the log information 13b.

As described above, if creation of a log-off log and a shutdown log is determined by using both the system date and the OS counter, in contrast to the manner of determining whether a log-off log and a shutdown log are to be created by using the OS counter only, a correct determination is made even in the following situation. Suppose a situation where a first PC power-on action, then a PC forced shutdown action, and finally a second PC power-on action are conducted at short intervals. If the time between the second PC power-on action and the reboot of the monitoring app is longer than the time between the first PC power-on action and the forced shutdown of the PC, although the PC has been forced to shut down, the OS-counter acquired value can be higher than the stored value. Therefore, if whether the PC has been rebooted is determined using the difference between the system-date acquired value and the system-date stored value, regardless of whether the magnitude relation between the OS-counter acquired value and the OS-counter stored value, a log-off log and an end log are created and, thereby, the lack of log information that can occur in the above situation is prevented.

As described with reference to FIG. 2, the log creating unit 17d also operates as a comparing unit that compares other time information with the time information stored in the storage area. The function of the comparing unit can be assigned to a functional unit separated from the log creating unit 17d.

Process Flow

The flow of a process performed by the client terminal according to the present embodiment is described below. In this section, two processes performed by the client terminal 10 are described sequentially. A log-on/log-off monitoring process is described first, and a termination-log acquiring process is described second.

(1) Log-On/Log-Off Monitoring Process

Figure 12:
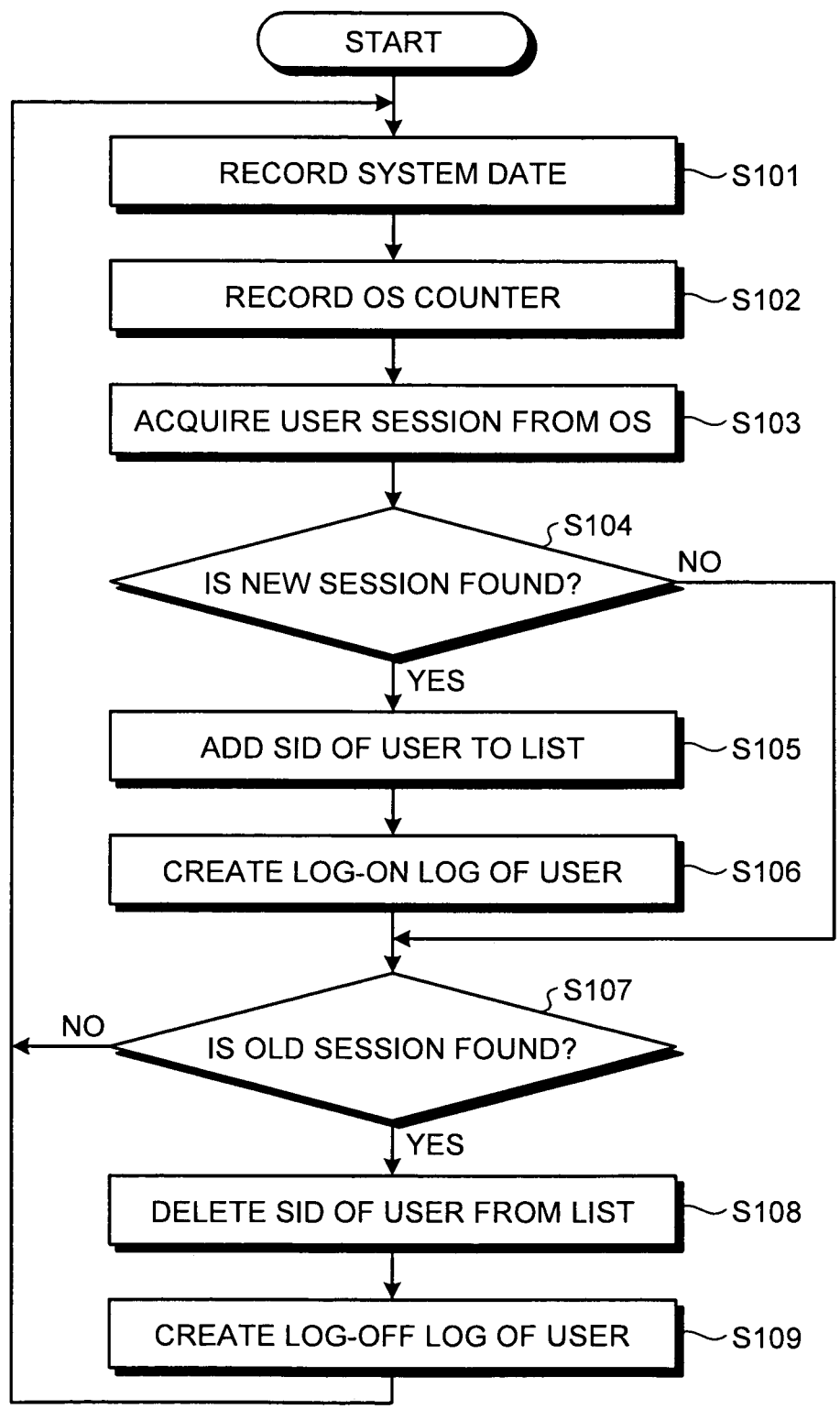
FIG. 12 is a flowchart of a log-on/log-off monitoring process according to the first embodiment.

FIG. 12 is a flowchart of the log-on/log-off monitoring process according to the embodiment. The log-on/log-off monitoring process is performed, repeatedly at certain intervals after the monitoring app is booted until the monitoring app is terminated.

As illustrated in FIG. 12, the storing unit 17b stores the value of the system date and the value of the OS counter that are acquired by the acquiring unit 17a from the OS executing unit 15 in the storage unit 13 as the time information 13c (Steps S101 and S102).

After that, the log creating unit 17d sends an SID acquiring request to the OS executing unit 15 and acquires SIDs of log-on users (Step S103). The log creating unit 17d then determines whether the SIDs acquired from the OS executing unit 15 includes an SID that is not identical to any SID of the log-on user list 13a stored in the storage unit 13, i.e., whether there is a new session (Step S104).

If there is a new session (Yes at Step S104), the log creating unit 17d adds the new user ID and the new SID to the log-on user list 13a (Step S105). The log creating unit 17d then creates a log-on log that includes the new user ID and the new SID (Step S106) and registers the log-on log to the log information 13b.

On the other hand, if there is no new session (No at Step S104), because there is no new log-on user and no new SID, the process control directly goes to Step S107.

After that, the log creating unit 17d determines whether the SIDs of the log-on user list 13a stored in the storage unit 13 includes an SID that is not identical to any SID acquired from the OS executing unit 15, i.e., there is an old session (Step S107).

If there is an old session (Yes at Step S107), the log creating unit 17d deletes the log-off user ID and the log-off SID from the log-on user list 13a (Step S108). After that, the log creating unit 17d creates a log-off log that includes the log-off user ID and the log-off SID (Step S109) and registers the log-off log to the log information 13b. If there is no old session (No at Step S107), the process control directly returns to Step S101.

As described above, the monitoring-app executing unit 17 repeats the processes from Steps S101 to S109 so long as the monitoring app is active.

(2) Termination-Log Acquiring Process

Figure 13:
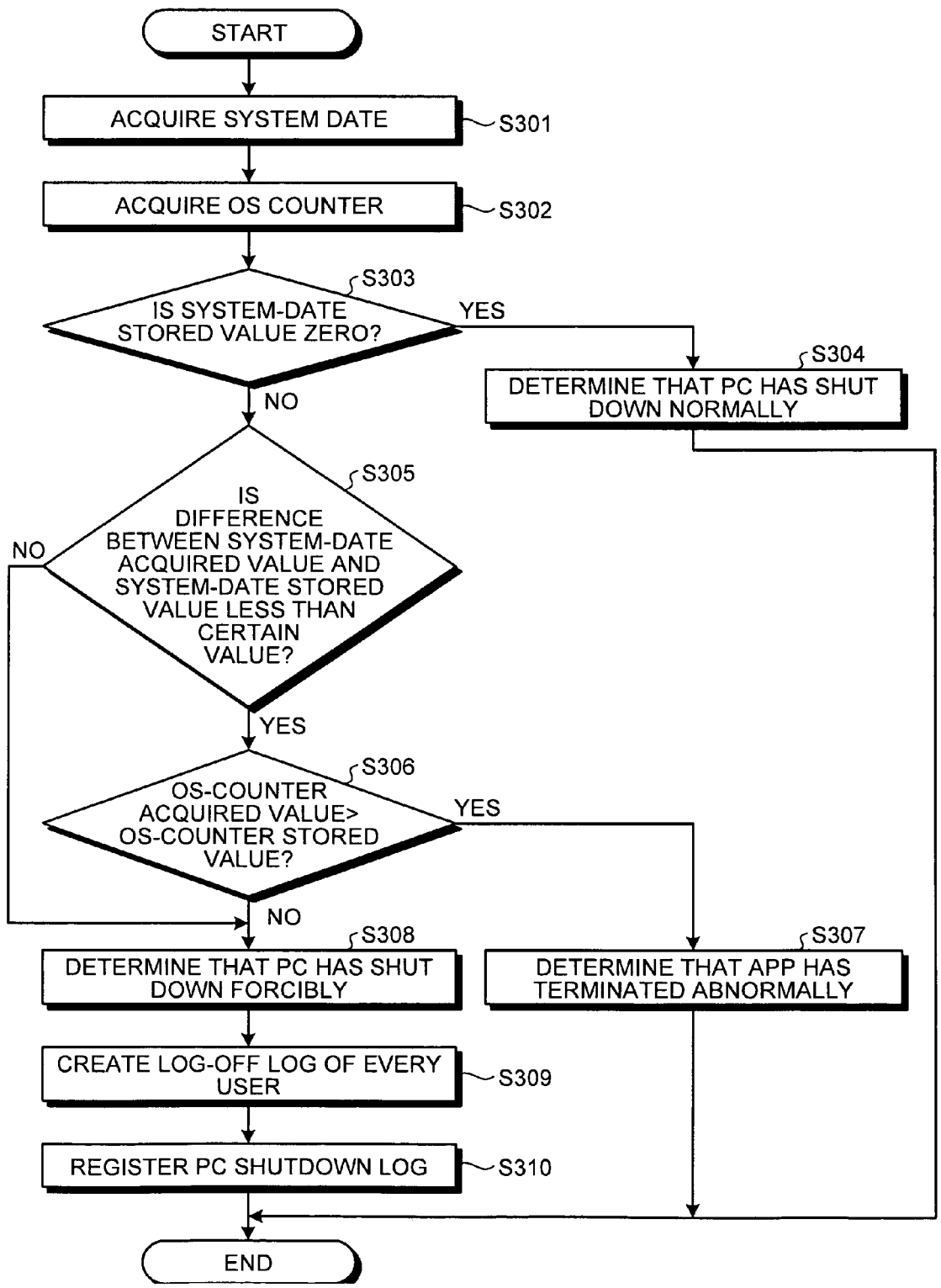
FIG. 13 is a flowchart of a termination-log acquiring process according to the first embodiment.

FIG. 13 is a flowchart of the termination-log acquiring process according to the embodiment. The termination-log acquiring process is performed when the log-off/log-on monitoring app is booted. When the termination-log acquiring process is completed, the process control goes to the log-on/log-off monitoring process.

As illustrated in FIG. 13, when the monitoring app is booted, the log creating unit 17d causes, via the OS executing unit 15, the acquiring unit 17a to acquire the system date and the OS counter (Steps S301 and S302).

The log creating unit 17d determines whether the system-date stored value that is stored in the storage unit 13 as the time information 13c is zero (Step S303). If the system-date stored value is zero (Yes at Step S303), the log creating unit 17d determines that the PC has shut down normally (Step S304) and the process control goes to end and no log-off log and no end log are created.

On the other hand, if the system-date stored value is not zero (No at Step S303), the log creating unit 17d further determines whether the difference between the system-date acquired value and the system-date stored value is equal to or lower than a certain threshold, for example, 10 seconds (Step S305). If the difference between the system-date acquired value and the system-date stored value is less than the certain value (Yes at Step S305), the log creating unit 17d further determines the OS-counter acquired value is higher than the OS-counter stored value (Step S306).

If the OS-counter acquired value is higher than the OS-counter stored value (Yes at Step S306), the log creating unit 17d determines as follows. The log creating unit 17d determines that the monitoring app has been terminated due to an abnormal stop (Step S307) and the process control goes to end and no log-off log and no end log are created.

On the other hand, if the difference between the system-date acquired value and the system-date stored value is higher than the certain value (No at Step S305) or the OS-counter acquired value is equal to or smaller than the OS-counter stored value (No at Step S306), the log creating unit 17d determines as follows. The log creating unit 17d determines that the PC has been forced to shut down (Step S308).

In this case, the log creating unit 17d creates a log-off log that includes the user ID and the SID stored in the log-on user list 13a (Step S309) and registers the log-off log to the log information 13b. Moreover, the log creating unit 17d sets the system-date stored value that is stored in the storage unit 13 to the last PC shutdown date, creates a PC shutdown log that includes both the PC shutdown date and information indicative of a forced shutdown of the PC in the form of, for example, a flag, and registers the PC shutdown log to the log information 13b (Step S310). After the log-off log and the shutdown log are created, the process control goes to end.

If the log-off log and the shutdown log are created by using the system date only, Steps S302 and S306 are omitted from Steps S301 to S310. If the log-off log and the shutdown log are created by using the OS counter only, Steps S301 and S305 are omitted from Steps S301 to S310 and, at Step S303, whether the OS-counter stored value is zero is determined instead of whether the system-date stored value is zero is determined.

The log creating unit 17d can perform the determination at Step S305 using the system date and the determination at Step S306 using the OS counter in the reverse order. In other words, if it is determined that the OS-counter acquired value is equal to or lower than the OS-counter stored value (Yes at Step S306), the log creating unit 17d then performs the determination at Step S305. If the difference between the system-date acquired value and the system-date stored value is higher than the certain value (No at Step S305), the log creating unit 17d determines that the PC has been forced to shut down. If the difference between the system-date acquired value and the system-date stored value is less than the certain value (Yes at Step S305), the log creating unit 17d determines that the monitoring app has been terminated due to an abnormal stop. On the other hand, the OS-counter acquired value is higher than the OS-counter stored value (No at Step S306), it is determined that a forced shutdown occurs.

Effects of the First Embodiment

As described above, the client terminal 10 according to the present embodiment has a plurality of inter-booting apps including a monitoring app. When the monitoring app is terminated abnormally and then booted up, if the value of the last termination time is higher than the value of the current time, the monitoring app determines that the monitoring app has been terminated abnormally and does not create log information that relates to a termination of the OS. Therefore, the client terminal 10 according to the present embodiment does not creates, in event of an abnormal stop of the monitoring app occurring when the client terminal 10 is running, an impossible shutdown log and an impossible log-off log. Accordingly, the client terminal 10 according to the present embodiment can acquire a correct log that relates to a termination of the basic software, such as a log of a shutdown of the PC and a log of a log-off from the PC.

If the difference between the system dates is equal to or higher than a certain value, the client terminal 10 according to the present embodiment creates log information that relates to a termination of the OS. Moreover, even if the difference between the system dates is lower than the certain value, if the OS-counter stored value is higher than the OS-counter acquired value, the client terminal 10 according to the present embodiment creates log information that relates to a termination of the OS. Therefore, even if a first power-on action, then a forced-shutdown action, and finally a second power-on action are conducted at short intervals, the client terminal 10 according to the present embodiment does not fail to create a log of logging-off from the PC and a log of shutting the PC down.

If a value acquired as the time information is lower than a value stored as the time information, the client terminal 10 according to the present embodiment does not create log information that relates to a termination of the OS. If a value acquired as the time information is higher than a value stored as the time information, the client terminal 10 according to the present embodiment creates log information that relates to a termination of the OS. Therefore, the client terminal 10 according to the present embodiment does not create, in event of an abnormal stop of the monitoring app, an impossible shutdown log and an impossible log-off log. The client terminal 10 creates a log-off log and a shutdown log only when the client terminal 10 has been forced to shut down.

[b] Second Embodiment

The embodiments of the device of the present invention are described above. However, the present invention is not limited to the above embodiments and can be implemented in various different embodiments. Some other embodiments of the present invention are described below.

Separation and Integration

The constituent elements of each device illustrated in the drawings need not be physically configured as illustrated. The separated/integrated way of each device is not limited to the way as illustrated and the constituent elements, as a whole or in part, can be separated or integrated on an arbitrary unit basis either functionally or physically based on various types of loads or use conditions. For example, the acquiring unit 17a, the storing unit 17b, the log sending unit 17c, or the log creating unit 17d can be an external device that is connected to the client terminal 10 via a network. Moreover, the acquiring unit 17a, the storing unit 17b, the log sending unit 17c, or the log creating unit 17d can be included in a different device. They are connected to each other via a network so that they operate together to implement the functions of the client terminal 10.

Termination-Log Acquiring Program

Figure 14:
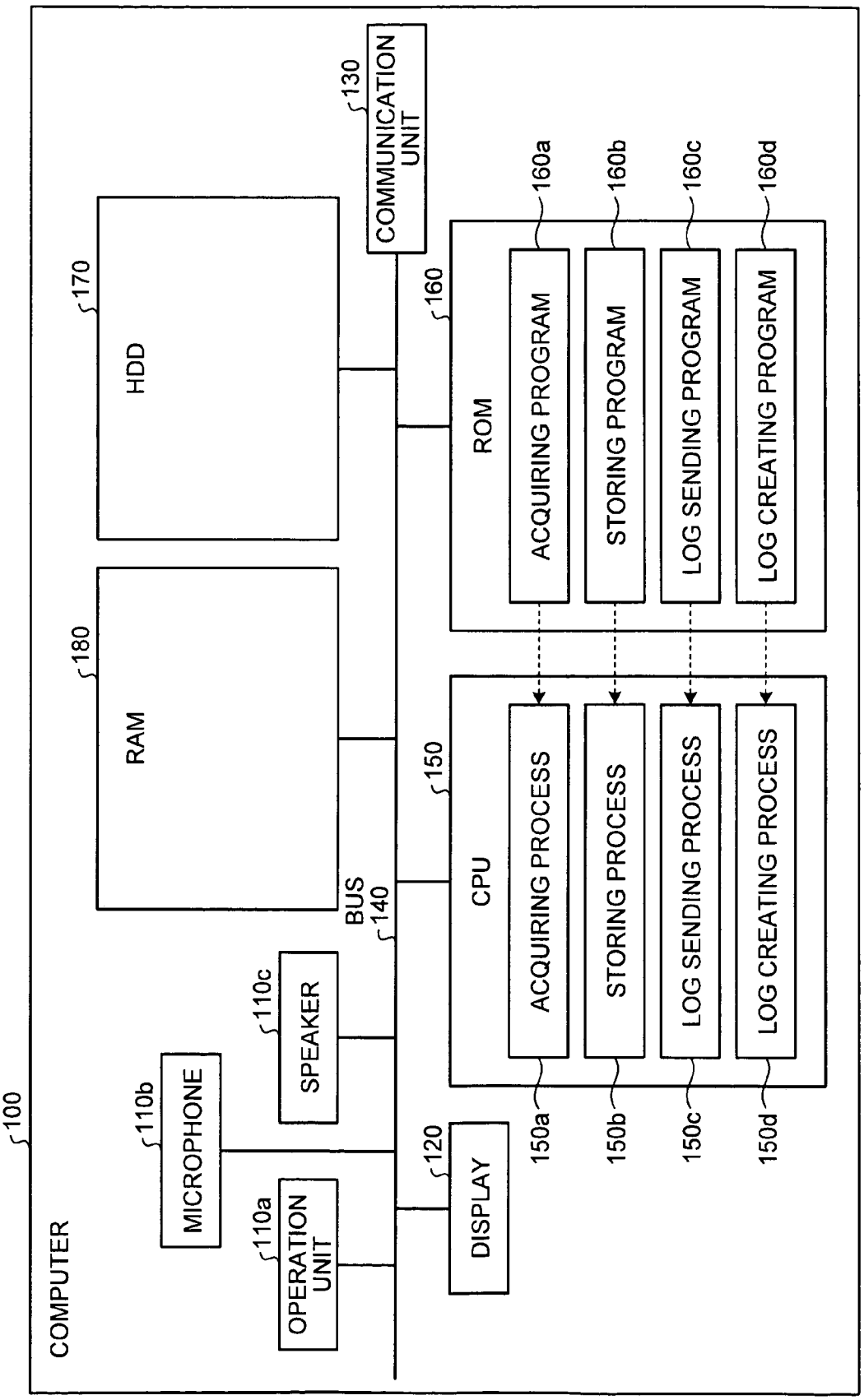
FIG. 14 is a block diagram of an example of a computer that executes a termination-log acquiring program according to the second embodiment.

The processes described in the above embodiments can be implemented when a computer, such as a personal computer and a work station, executes a prepared program. In the following, an example of a computer that executes a termination-log acquiring program having the same functions as described in the above embodiments is described with reference to FIG. 14. FIG. 14 is a block diagram of an example of the computer that executes the termination-log acquiring program according to the second embodiment.

As illustrated in FIG. 14, a computer 100 according to the second embodiment includes an operation unit 110a, a microphone 110b, a speaker 110c, a display 120, and a communication unit 130. The computer 100 further includes a CPU 150, a ROM 160, a hard disk drive (HDD) 170, and a random access memory (RAM) 180. The above units 110 to 180 are connected to each other via a bus 140.

The ROM 160 prestores therein control programs that have the same functions as the acquiring unit 17a, the storing unit 17b, the log sending unit 17c, and the log creating unit 17d described in the first embodiment have. As illustrated in FIG. 14, the ROM 160 stores therein an acquiring program 160a, a storing program 160b, a log sending program 160c, and a log creating program 160d. As it is described above that the constituent elements of the client terminal 10 illustrated in FIG. 2 can be separated or integrated, these programs 160a to 160d can also be separated or integrated as appropriately. It is not necessary to always store the entire data in the RAM 180. The RAM 180 needs to include only some data necessary for the process.

After that, the CPU 150 reads the programs 160a to 160d from the ROM 160 and executes the programs. When the CPU 150 executes the programs, as illustrated in FIG. 14, the programs 160a to 160d operate as an acquiring process 150a, a storing process 150b, a log sending process 150c, and a log creating process 150d, respectively. These processes 150a to 150d correspond to the acquiring unit 17a, the storing unit 17b, the log sending unit 17c, and the log creating unit 17d illustrated in FIG. 2, respectively. It is not necessary to always operate all the processing units on the CPU 150. Only some processing units necessary for the process need to be implemented virtually on the CPU 150. The CPU 150 executes the end-log acquiring program by using information stored in the RAM 180.

The termination-log acquiring program do not need to be stored in the HDD 170 and the ROM 160 by default. For example, the programs can be stored in a portable physical medium" insertable to the computer 100, such as a flexible disk (FD), a CD-ROM, a DVD disk, a magnet-optical disk, and an IC card, that is inserted to the computer 100. Then, the computer 100 acquires the programs from the portable physical medium and executes the programs. Alternatively, the programs can be stored in another computer or a server device that is connected to the computer 100 via a public line, the Internet, a LAN, a WAN, or the like. The computer 100 acquires the programs from the other computer or server and executes them.

According to an aspect of the disclosed termination-log acquiring program, a correct log of the termination of basic software is acquired.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable storage medium having stored therein a termination-log acquiring program that causes a computer to execute a process comprising:

receiving first start command information indicative of a command to start monitoring in response to a boot command issued by a user to boot the computer;

acquiring, when the first start command information is received, first time information, repeatedly at certain time intervals from basic software that operates on the computer;

storing the first time information acquired repeatedly at the certain time intervals in a storage area;

receiving termination command information indicative of a command to terminate the basic software;

when the received termination command information is information indicative of a command to terminate the basic software by using the basic software, storing normal termination information indicative of a normal termination in the storage area;

when second start command information that is different from the first start command information is received, accessing the storage area;

when the normal termination information is not stored in the storage area, acquiring second time information from the basic software;

comparing the second time information with the first time information that is stored in the storage area; and creating, depending on a comparison result, log information that relates to a termination of the basic software, wherein the acquiring first time information includes acquiring the first time information that includes a first system date counted by the basic software, the acquiring second time information includes acquiring the second time information that includes a second system date, the comparing includes calculating a difference between the second system date and the first system date that is stored in the storage area, and the creating includes creating, when the difference between the second system date and the first system date is equal to or higher than a certain value, the log information that includes information indicating that the computer has been shut down without using the basic software.

2. The non-transitory computer readable storage medium according to claim 1, wherein the termination-log acquiring program causes the computer to execute the process further comprising:

determining, when the difference between the second system date and the first system date is lower than the certain value, that the monitoring has been terminated without receiving the termination command information; and skipping the creating of the log information.

3. The non-transitory computer readable storage medium according to claim 1, wherein the acquiring first time information includes acquiring the first time information that includes a first OS counter counted by the basic software, the acquiring second time information includes acquiring the second time information that includes a second OS counter, the comparing includes comparing the second OS counter with the first OS counter, and the creating includes creating, when the second OS counter is lower than the first OS counter, the log information that includes information indicating that the computer has been shut down without using the basic software.

4. The non-transitory computer readable storage medium according to claim 1, wherein the termination-log acquiring program causes the computer to execute the process further comprising:

performing, when the second start command information indicates a command to start monitoring not based on the boot command issued by the user, a process to start the monitoring.

5. A terminal device comprising
a processor; and
a memory, wherein the processor executes:

receiving first start command information indicative of a command to start monitoring in response to a boot command issued by a user to boot a computer;

acquiring, when the first start command information is received, first time information, repeatedly at certain time intervals from basic software that operates on the computer;

storing the first time information acquired repeatedly at the certain time intervals in the memory;

receiving termination command information indicative of a command to terminate the basic software;

when the received termination command information is information indicative of a command to terminate the basic software by using the basic software, storing normal termination information indicative of a normal termination in the memory;

when second start command information that is different from the first start command information is received, accessing the memory;

when the normal termination information is not stored in the memory, acquiring second time information from the basic software;

comparing the second time information with the first time information that is stored in the memory; and creating, depending on a comparison result, log information that relates to a termination of the basic software, wherein the acquiring first time information includes acquiring the first time information that includes a first system date counted by the basic software, the acquiring second time information includes acquiring the second time information that includes a second system date, the comparing includes calculating a difference between the second system date and the first system date that is stored in the memory, and the creating includes creating, when the difference between the second system date and the first system date is equal to or higher than a certain value, the log information that includes information indicating that the computer has been shut down without using the basic software.

6. The terminal device according to claim 5, wherein the process further executes:

determining, when the difference between the second system date and the first system date is lower than the certain value, that the monitoring has been terminated without receiving the termination command information; and skipping the creating of the log information.

7. The terminal device according to claim 5, wherein the acquiring first time information includes acquiring the first time information that includes a first OS counter counted by the basic software, the acquiring second time information includes acquiring the second time information that includes a second OS counter, the comparing includes comparing the second OS counter with the first OS counter, and the creating includes creating, when the second OS counter is lower than the first OS counter, the log information that includes information indicating that the computer has been shut down without using the basic software.

8. The terminal device according to claim 5, wherein the process further executes:

performing, when the second start command information indicates a command to start monitoring not based on the boot command issued by the user, a process to start the monitoring.

9. The non-transitory computer readable storage medium according to claim 3, wherein
the first OS counter and the second OS counter are count values measured by the basic software that is an operating system measuring the count values as time passes from booting of the operating system.

10. A device that is capable of executing an operating system and a log generation program for generating an operation log of the operating system comprising:
a memory that stores a system date acquired from the operating system and an operation log of the operating system generated by the log generation program at the system date in an associated manner, and
a processor coupled to the memory,
wherein the processor executes a process comprising:
acquiring the operation log by executing the log generation program at a predetermined time intervals,
recording the acquired operation log by associating with the system date in the memory,
when the log generation program is booted, acquiring a first system date from the operating system and reading a second system date that is a latest date among system dates stored in the memory,
determining that the log generation program is booted in conjunction with a reboot of the operating system when a difference between the first system date and the second system date is equal to or larger than a predetermined value; and,
determining that the log generation program is booted without the reboot of the operating system when the difference is less than the predetermined value.

* * * * *